United States Patent Office 3,073,419
Patented Jan. 15, 1963

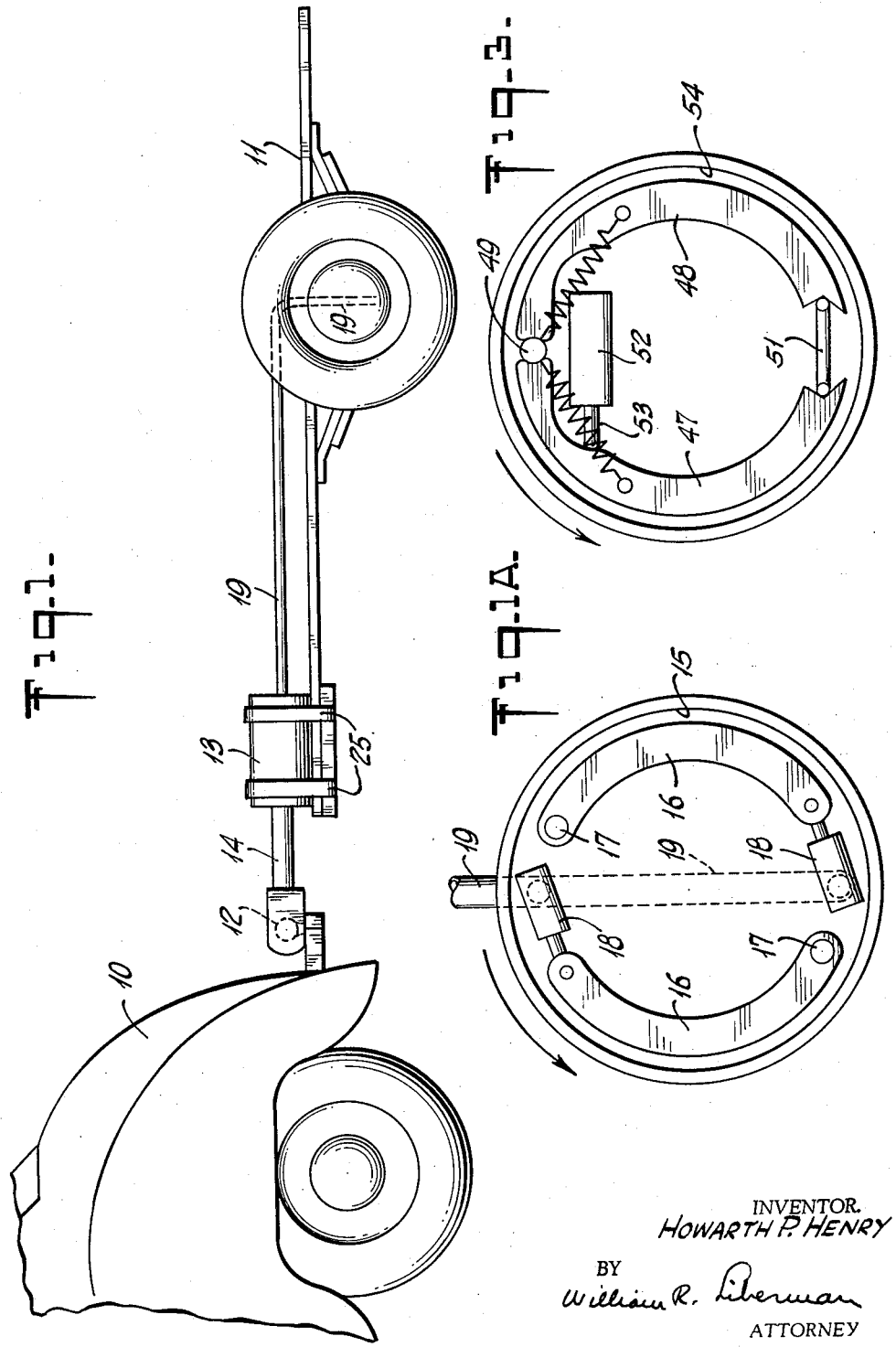

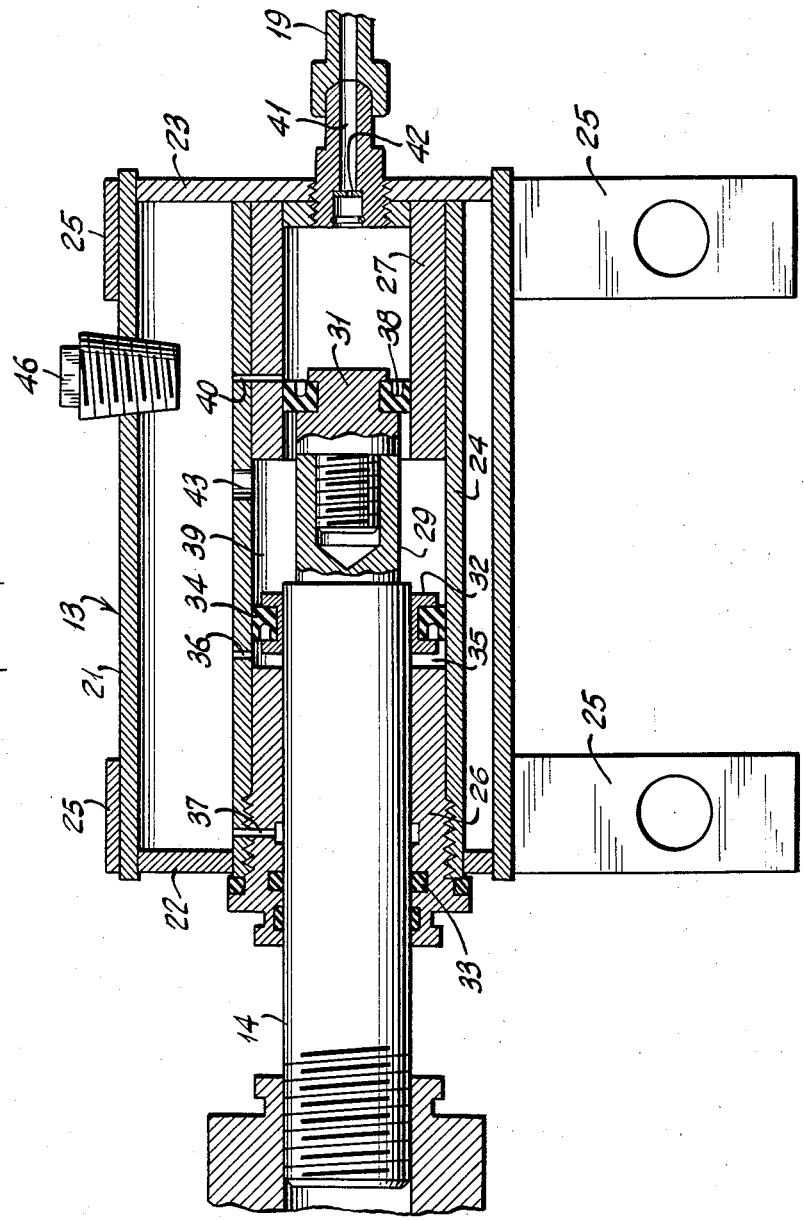

---

3,073,419
BRAKES FOR TRAILER VEHICLES
Howarth Padgett Henry, New York, N.Y.
Filed Sept. 8, 1958, Ser. No. 759,587
Claims priority, application Great Britain Oct. 23, 1957
3 Claims. (Cl. 188—112)

This invention relates to brakes for trailer vehicles, of the type in which the brakes are applied automatically by forward movement of the trailer vehicle relative to a towing vehicle. It has been proposed to provide such brakes in which forward movement of the trailer vehicle relative to the towing vehicle displaces the piston of a liquid pressure master cylinder to create liquid pressure which acts in motor cylinders to apply the trailer brakes.

One problem which is encountered with trailer brakes of this type is that the brakes are applied when the towing vehicle is backed up towards the trailer vehicle, and the combination is difficult or impossible to drive in reverse without rendering the trailer brakes ineffective by, for example, mechanically locking the vehicles against relative backward movement of the towing vehicle.

This problem has been overcome, by the invention described in my British Patent 714,400 and corresponding United States Patent 2,698,069, by arranging for mechanical opening of a relief valve in the fluid pressure master cylinder when the towing vehicle is backed up towards the trailer vehicle to a sufficient extent. That solution of the problem, however, is relatively expensive, and the object of the present invention is to provide a simpler and more economical solution of the problem.

According to the present invention, in a trailer braking system including liquid pressure brake applying means actuated automatically by movement towards each other of the said vehicle and a towing vehicle to which it is coupled, the brakes of the said trailer vehicle are drum-and-shoe brakes having a self-energizing, or booster, action only in the direction of rotation of the drums corresponding to forward motion of the vehicle.

The brakes may be of the two-leading-shoe type, or they may be of the type including a primary shoe acted on by the applying means and a secondary shoe receiving thrust from the primary shoe, the applying primary shoe being acted on by the applying means at the end thereof which is the toe end during rotation of the drums in the direction corresponding to forward movement of the vehicle.

The invention is hereinafter described with reference to the accompanying drawings, in which:

FIGURE 1 is a diagrammatic side elevation of a towing-and-trailer-vehicle combination having a braking system according to the invention;

FIGURE 1–A is a brake assembly according to the present invention;

FIGURE 2 is a sectional elevation of the master cylinder unit of the braking system shown in FIGURE 1; and FIGURE 3 shows an alternative form of brake assembly which may be used in the system according to the invention.

Referring to FIGURE 1 of the accompanying drawings, a towing vehicle 10 has a trailer vehicle 11 hitched to its end by means of a ball hitch 12, the trailer vehicle 11 carrying, at its forward end, a housing 13 in which is mounted a brake master cylinder actuated by a rod 14 carrying the socket part of the ball hitch 12. The trailer brakes are of the two-leading shoe type, one of the brakes being shown at 15 and having two shoes 16, 16 each having a pivot pin 17 or other anchor member at its trailing end and acted on at its leading end by a liquid pressure motor cylinder 18. Both motor cylinders 18 are connected by a conduit 19 to the master cylinder, as are also the corresponding cylinders of the brake (not shown) on the other side of the trailer vehicle.

As shown in FIGURE 2, the master cylinder unit is generally similar to the corresponding unit shown in my application Serial No. 738,403, filed May 9, 1958, and now abandoned. The housing 13 comprises a metal tube 21 constituting a liquid reservoir. The tube 21 is closed at its end by discs 22, 23 having eccentrically mounted therein a smaller metal tube 24 abutting against the disc 23 and extending through the disc 22. The tubes 21, 24 and the discs 22, 23 are conveniently secured together by furnace brazing. The tube 21 has metal straps 25, 25 welded or brazed to it to facilitate its attachment to the trailer vehicle. Inside the tube 24 there are mounted, one at each end, two metal sleeves 26 and 27, the sleeve 26 at the front end having a screw-threaded engagement with the tube 24 so that it can be removed, and the sleeve 27 being permanently fixed in position and serving as the master cylinder.

The rod 14, which is slidable in the sleeve 26, is reduced in diameter at its rear end, at 29, and is recessed axially at that end and screw-threaded internally to receive a screw-threaded stem formed on a master-cylinder piston 31 which slides in the master-cylinder sleeve 27. The rod 14 also carries a damping piston 32 slidable in the damping cylinder tube 24 between the sleeves 26 and 27. The rod 14 passes through a fluid-tight packing 33 at the forward end of the sleeve 26, and the damping piston 32 carries a cup-type packing 34 capable of collapsing to allow the flow of liquid past the said piston into the space 35 in front of the said piston, which space constitutes a damping chamber and is connected to the reservoir through a small orifice 36. Any liquid which may leak between the rod 14 and the sleeve 26 is returned to the reservoir through a drilling 37, supplied by an internal circumferential groove in sleeve 26.

The master cylinder piston 31 carries a cup-type packing 38 capable of collapsing to allow liquid to flow from the space 39 behind the damping piston 32 into the bore of the sleeve 27, which constitutes the master cylinder bore and is connected to the reservoir by a small orifice 40, closed by the packing 38 on initial movement of the piston 31 from its normal position. Liquid passes from the master cylinder to the motor cylinders 18 through an outlet 41 and the conduit 19, a disc valve 42 being provided in the outlet 41 which provides a restriction to outward flow of liquid but is movable during return flow to a position in which the restriction is reduced.

The space 39 constitutes a reserve liquid chamber for the master cylinder, and is connected to the main reservoir by an opening 43 in the tube 24.

A filling plug 46 is provided in the top of the reservoir.

When the trailer vehicle tends to overrun the towing vehicle, the master cylinder piston 31 moves rearwardly in the sleeve 27, forcing liquid through the outlet 41 to apply the brakes. Owing to the restriction at 42 in the outlet the master cylinder also acts as a dashpot to regulate the rate of relative movement of the vehicles. The shoes 16 of the brakes all act as leading shoes, giving a high degree of braking for a relatively small liquid pressure in the system.

When the towing pull is restored, the rod 14 tends to move forwardly, and valve 42 opens to freely permit fluid in the braking system to reenter the master cylinder. The forward movement, however, is damped by the movement of the damping piston 32 in the tube 24, this piston forcing liquid from the chamber 35 into the reservoir through small opening 36.

If the towing vehicle 10 is backed up towards the trailer vehicle, pressure is produced in the master cylinder to apply the trailer brakes, but, since the brake shoes 16 are all, during such movement, acting as trailing shoes (trailing behind anchor points 17), the degree of reverse-movement braking is several times less than the degree of forward-movement braking as occurs when the piston of cylinder 18 urges the end of the shoe 16 to which it is connected against the drum 15; that end—during forward movement—being the leading end of the shoe. Consequently, the brakes are unable to hold the trailer vehicle against reverse movement, so that the combination of vehicles can be backed without the necessity for any locking or other device to prevent the brakes from working.

It is understood, of course, that the distance a trailer must be backed is ordinarily quite small compared to the distance it is pulled forward. Consequently, the extra backward thrust of the towing vehicle to overcome the slight backward braking of the trailer is usually of little consequence.

The reason for the large difference in braking force produced by a given liquid pressure during forward and reverse movement of the vehicles is that, during forward movement the rotation of the brake drums assists the brake applying force, producing what is known as a regenerative or booster effect, whereas during backward movement the rotation of the drums opposes the brake applying force, thereby producing a degenerative effect. In a two-leading shoe brake the booster effect is due to the drag of the drum tending to pull the shoes more firmly into contact therewith. Other shoe brake arrangements also provide uni-directional booster effect.

Another example of a suitable form of brake is shown in FIGURE 3, in which two shoes 47, 48, both spring-biased at one pair of adjacent ends against an anchor pin 49, are connected one to the other at their opposite ends by a thrust member 51, and are actuated in tandem by a single-ended wheel cylinder 52 fixed to the back-plate which carries the shoes. The wheel cylinder 52 has its piston acting directly, through a push-rod 53, only on the shoe 47, its action on shoe 48 being indirect, by way of shoe 47 and thrust link 51.

During forward movement of the vehicle, the drum 54 rotates in the direction of the arrow. It will be seen that the drag of the drum, when the brake is applied, will tend to carry the primary shoe 47 round with it and apply a load, derived from the applying force and the drum drag, through link 51 to the shoe secondary 48, which itself tends to be pulled towards the drum by the drag thereof. Clearly, when the drum is rotating in the opposite direction, this regenerative or booster action will not take place, and is replaced by a degenerative effect because the drum drag will then oppose the applying thrust.

While I have described above the principles of my invention in connection with specific apparatus, it is to be clearly understood that this description is made only by way of example and not as a limitation to the scope of my invention.

I claim:

1. A tractor-drawn trailer braking device consisting essentially of a trailer wheel-carried brake drum rigidly affixed to and rotatable with said trailer wheel in a forward sense with the forward rotation of said wheel, a brake shoe system associated with said brake drum and including at least one arcuate brake shoe having a face extending peripherally along and confronting the peripheral surface of said drum, a substantially stationary hinge member engaging the brake shoe of said brake shoe system adjacent the trailing end thereof relative to the forward rotation of said drum, and a brake-actuating mechanism responsive to the approach between said trailer and tractor and coupled to said brake drum only through said brake shoe system, including a master cylinder and piston connected between said tractor and trailer and a brake cylinder in fluid communication with said master cylinder and a piston registering with said brake cylinder and mechanically connected to said brake shoe adjacent the leading end thereof.

2. A trailer device in accordance with claim 1, wherein said master cylinder is mounted on said trailer, and said master cylinder piston is connected to said tractor.

3. A trailer vehicle braking system according to claim 1, wherein said brake shoe system is of the two-leading-shoe type.

References Cited in the file of this patent

UNITED STATES PATENTS

| | | |
|---|---|---|
| 1,921,161 | Iversen | Aug. 8, 1933 |
| 1,966,670 | Klammer et al. | July 17, 1934 |
| 2,221,929 | Snider | Nov. 19, 1940 |
| 2,294,329 | Ayers | Aug. 25, 1942 |
| 2,737,265 | Cushman | Mar. 6, 1956 |
| 2,741,335 | Brooks | Apr. 10, 1956 |
| 2,973,062 | Tucker | Feb. 28, 1961 |
| 2,973,839 | De Puydt | Mar. 7, 1961 |

FOREIGN PATENTS

| | | |
|---|---|---|
| 922,922 | Germany | Dec. 9, 1954 |
| 410,092 | Italy | Mar. 22, 1945 |
| 462,446 | Italy | Mar. 17, 1951 |